Patented Apr. 24, 1951

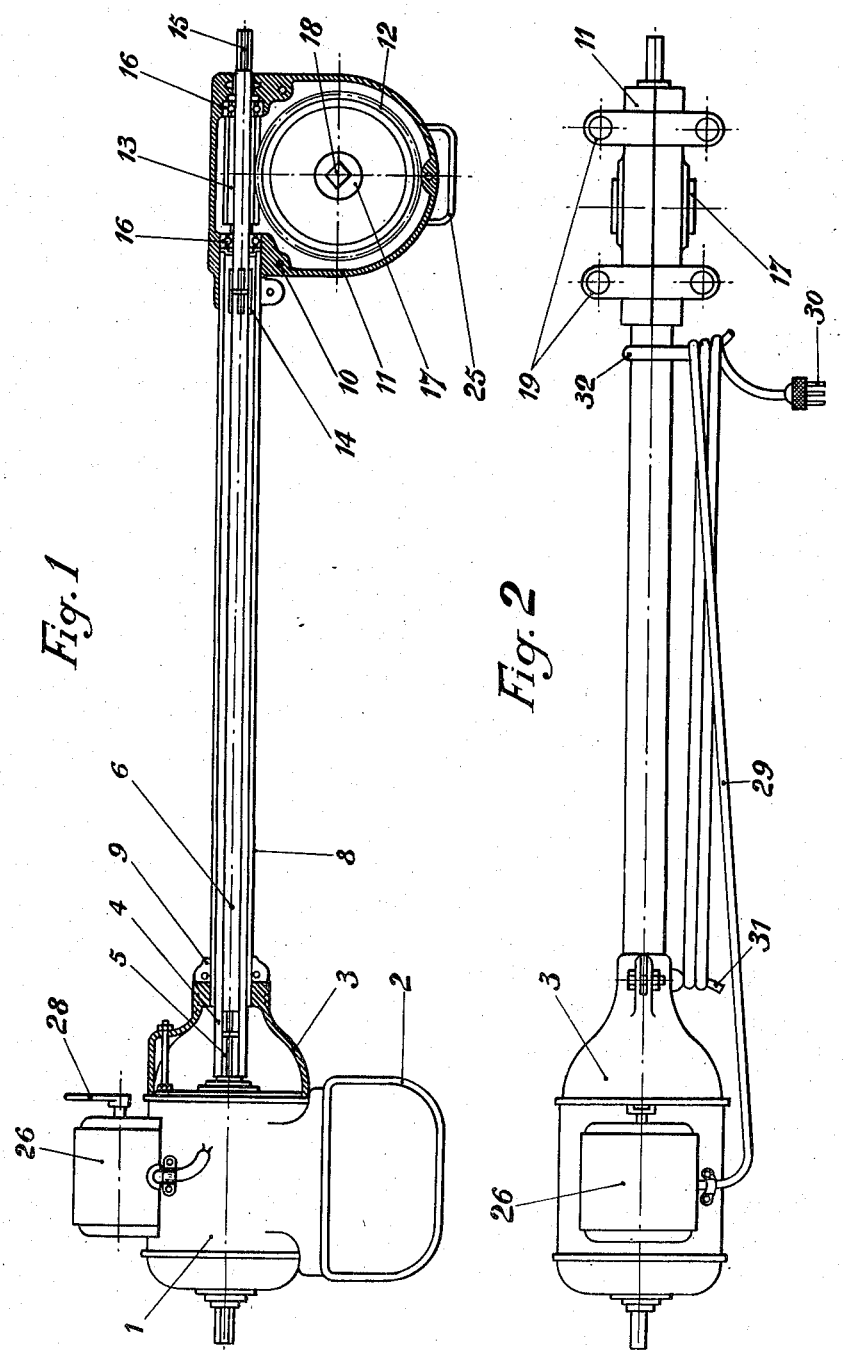

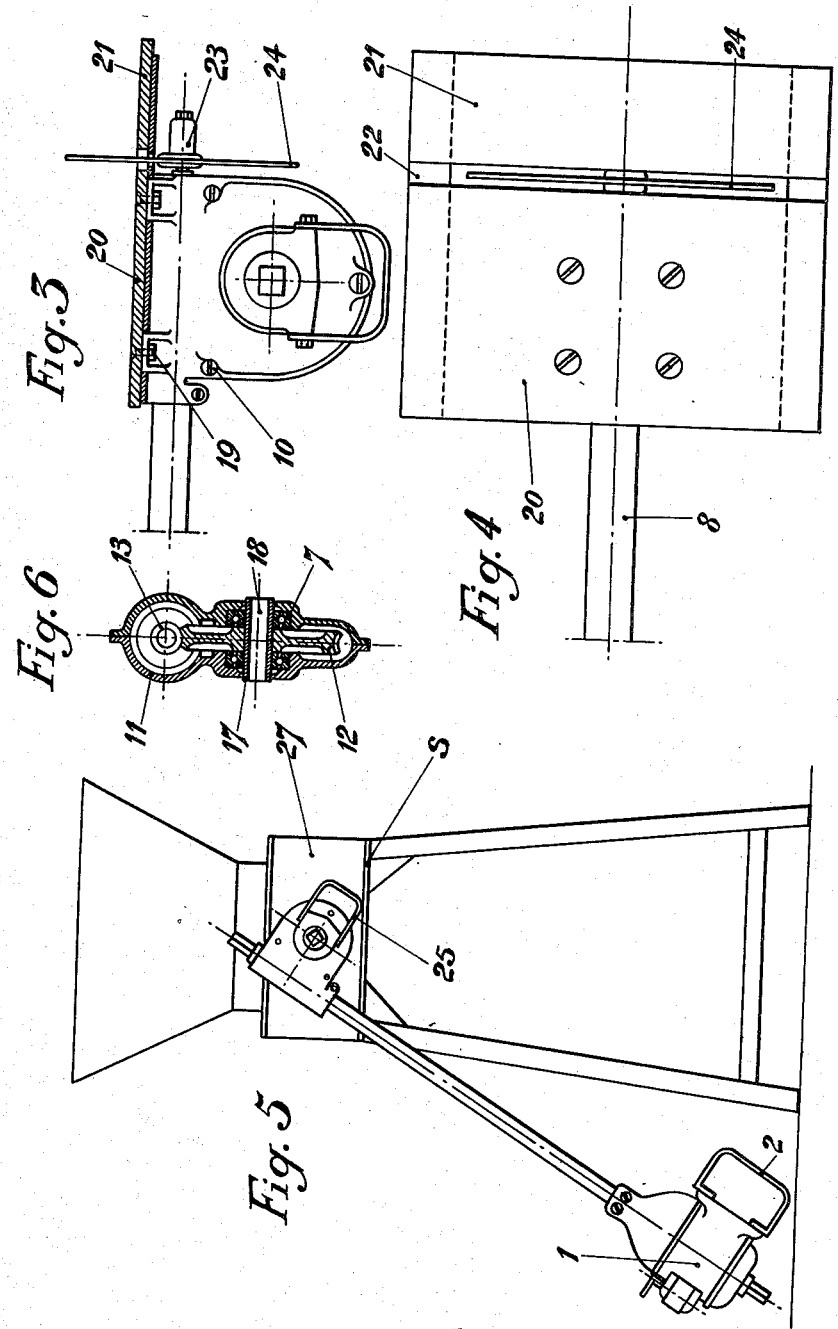

2,550,590

UNITED STATES PATENT OFFICE 2,550,590

APPARATUS FOR THE MECHANICAL ACTUATION OF AGRICULTURAL IMPLEMENTS

Jean Parmilleux, Lyons, France

Application September 6, 1946, Serial No. 695,261
In France March 12, 1942

Section 1, Public Law 690, August 8, 1946
Patent expires March 12, 1962

6 Claims. (Cl. 74—16)

This invention relates to the mechanical actuation of agricultural implements such for example as those used in farming and animal husbandry and has for its primary object to provide an apparatus of improved structure whereby such implements can be actuated mechanically under much better conditions than is normally possible by hand.

Another object of the invention is to provide such an improved apparatus comprising no driving belts and therefore obviating all disadvantages inherent to the use of belts for transmission or actuation purposes while lending itself to a very easy manipulation owing to its reduced weight and handy character.

A further object of the invention is to provide such an actuating apparatus having a rugged and watertight structure and capable of being used under all weather conditions, for example for operating agricultural implements either indoors or outdoors, at adjustable speeds, to suit operating conditions of churning, straw-cutting, winnowing, sifting, wood-cutting or other machines.

A still further object of the invention is to provide such an actuating apparatus wherein a gear is so operated by a motor through an intermediate shaft of considerable length that the moment of resistance of the torque derived from the motor weight and length of shaft is sufficient to overcome the opposed torque represented by the implement to be actuated, even where the latter is at rest, while not raising the motor off the ground despite any tendency to such raising action.

With these and such other objects in view as will incidentally appear hereafter, the invention comprises the novel construction and combination of parts that will now be described with reference to the accompanying diagrammatic drawings which illustrate a suitable constructional embodiment of the invention and which form a part of the present disclosure.

In the drawings:

Fig. 1 is an elevational view partly in section showing the apparatus in its entirety.

Fig. 2 is a top plan view of the apparatus.

Figs. 3 and 4 are respectively an elevational and a plan view showing one end of the apparatus, said end being arranged for the operation of a circular saw.

Fig. 5 is a view showing how by way of example the improved actuating apparatus can be used for driving an agricultural implement.

Fig. 6 is a vertical sectional view of the reducing gear.

As shown, the apparatus comprises an electric motor 1 whose base portion is rigidly secured to one or several yoke-shaped skids or brackets 2. These brackets are adapted to act as flexible carriers by resting on the ground as illustrated in Fig. 5. Where, for special purposes, the apparatus should be more easily moved about on the ground, revoluble castors (not shown) may be provided either directly on the base portion of the motor 1 or on the brackets 2.

The frame of motor 1 has secured at one end thereof in proper centered relationship with the shaft 5 a cup-shaped member 3 in which is housed a coupling sleeve 4 rigidly secured, for example by cotter or like means, to the motor shaft 5 and transmitting its revolution to an intermediate shaft 6 embodied in the improved apparatus and having a relatively considerable length. Concentrically to the shaft 6 is arranged a protecting torque tube 8 securely held at one end in a hub-like extension 9 of the cup member 3. The tube 8 is held at its opposite end in a hub-like extension of a casing 11 made up of a pair of shells assembled by bolts 10 and containing a reducing gear comprising a worm wheel 12 and a worm 13 meshing with said wheel and having its integral carrying spindle coupled to the intermediate shaft 6 by means of a sleeve 14 through which a retaining key or feather is engaged.

The spindle carrying the worm 13 projects outside the gear casing 11 and is provided at its projecting end with a split driving pin 15. Thrust ball bearings 16 ensure proper centered and frictionless revolution of the worm 13 through the upper end of the casing 11.

The hub portion 17 of the worm wheel 12 projects on either side of the casing 11 and has a square aperture 18 for driving purposes. On both sides of the worm wheel 12 are provided (see Fig. 6) ball bearings 7 encircling its hub portion and ensuring proper centered relationship of said wheel in the casing 11. As shown in Figs. 2 and 3, the top end of the gear casing 11 has a pair of transverse lugs 19 having holes for the engagement of screws or other means for securely holding a removable saw table made up of two spaced parts 20, 21 interconnected by transverse ties 22 (Fig. 4) and forming a slot through which a circular saw 24 is freely movable. This saw is clamped in proper operating position by a tubular retainer 23 having a tight fit on the one end of the spindle of the worm 13 and is driven from the intermediate shaft 6 through the driving pin 15.

The circular saw 24 is only shown as an example of one of a series of tools which can be actuated. As will be understood, any other tool may be provided instead of this saw.

The casing 11 for the reducing gear is also carried by a pair of skids or brackets 25 which are sufficiently resilient to damp out any impact, should the apparatus fall by accident and hit the ground. Normally such brackets 25 prop the live extremity of the apparatus, for example on a shelf S on the implement 27 to be actuated (see Fig. 5).

Over the motor 1 is arranged a box 26 containing switch or control means (of known construction) for said motor, said means being operated from a handle 28 protruding from one side of said box. The electric current is led to the box 26 and motor 1 through a flexible cable 29 terminating for example in a three pronged connector 30. The cable 29 forms a permanent attachment for the apparatus and can be folded alongside the tube 8 under a minimum volume and held by a pair of hooks 31, 32 when the apparatus is not being used. Obviously the length of the cable 29 will be selected to suit requirements, particularly where the apparatus has to be moved from one position to another for actuating different implements, for example in a farm house.

When it is desired to transport the apparatus from one place to another, it is an easy matter for the operator to grasp its middle tube 8 in his hand or, alternatively, to sling the same over his shoulder. As above stated, revoluble castors may also be provided on the motor brackets 2, in which case the apparatus can be rolled along the ground and towed by the operator who holds the other end of the apparatus in his hand. The weight of the apparatus is small enough to permit such manipulations without undue fatigues.

For actuating an agricultural implement such as the one designated by 27 in Fig. 5, the brackets 2 of the apparatus are fulcrumed on the ground while its opposite or operating end is raised to the level of the implement shaft which requires actuation. After bringing the aperture 18 in the hub of the worm wheel belonging to the reducing gear into coincidence with said implement shaft, it is an easy matter to couple them up by a side thrust, especially where this shaft carries an olive-shaped coupling member (not shown) of square cross section facilitating interengagement of the driving and driven shafts. Any holding means such as pins, cotters or feathers (not shown) may be used for preserving said interengagement as long as is necessary.

An example of using the apparatus for cutting logs of wood is shown in Figs. 3 and 4 where, as above stated, a saw table 20—21 is removably fixed upon the casing 11 while a circular saw 24 is freely engaged through an opening in said plate, the latter being used to carry the log ready for engagement with the revolving saw 24. The fact that the motor 1 is situated at a considerable distance from the saw permits the sawing operation of lengthy logs to be conveniently performed. The apparatus can be supported on any suitable carrying surface such for example as a horizontal bench. Circular saws of suitable diameters may be used to match the size of the logs of wood to be cut.

The motor 1 may be of the one-phase type and adapted for manual starting, thereby facilitating the use of electric current as commonly employed for lighting in farm houses, where power current is not available. Where, however, the electric plant permits it, the use of a three-phase motor comprising a star-delta connector provides for proper operation with two different efficiencies in 1:3 relationship, depending upon the nature of the implements to be actuated. A two-phase motor or a motor having a squirrel cage is also utilisable.

The transmission may be performed through the medium of a reversible worm gear, the motor 1 being allowed to run at its engaging speed, there being inserted into the free portion of the female coupling part of the reducing gear (which is then used as a multiplying gear) an attachment mounted on a pawl brace similar to handbraces commonly used by joiners or mechanics.

The implement actuatable by the apparatus according to the invention may be any one of a vast category of implements used in husbandry or farmwork routine, for example a fruit crusher, a cream churner, a cream separator, a straw cutter, a winnower or the like. As is well known, all such implements only require a relatively small power. For actuating other implements which require more power such as small thrashing machines, a pulley should be advantageously fitted to the other end of the shaft on the side opposite to the reducing gear side, the larger efficiency of the motor 1 being then used. Said larger efficiency is also available for cutting logs of large size.

The apparatus is also utilisable for several other purposes, for example for driving high speed revolving members such as universal mandrels, boring bits, emery grinding wheels, polishing brushes, etc. Owing to its small weight, it lends itself to easy transportation, for example to the attic of a farm house for actuating a sack or other elevator including a winch operated by the slow revolving worm wheel. This is not practicable with most existing actuating devices.

Constructional details of the apparatus may be varied without departing from the invention and the scope of the subjoined claims. Thus for example the reducing gear may be linked up to the motor through a bearing formed integral with the intermediate tube and, eventually, with the casing, no matter whether this casing is in one piece or made up of several parts. Moreover, the female aperture or coupling may be superseded by some sort of hollow projecting shaft which may have any suitable cross sectional area for being engaged with companion male portions of suitable cross section. Again the skids or brackets which are advantageously made of resilient wire or metal strip may be provided on the bearing cup instead of being provided on the adjacent motor itself. The reducing gear may be made up of a pair of juxtaposed reducing gears having their pinions arranged either in co-planar relation or at right angles or else set at any convenient angle and engaged by the same worm, thereby permitting two low speeds to be obtained with two wheels having different diameters while the running conditions of the motor remain unchanged. Finally the motor may be so selected as to enable a full scale of different speeds to be obtained by known means, thereby operating the apparatus and the implement actuated by it at similarly differentiated speeds.

What is claimed is:

1. As an article of manufacture, a portable power drive for actuating separately a plurality of farm implements and the like, said drive comprising a prime mover having a drive shaft and a frame, a rigid torque tube extending from said frame a considerable distance, a speed-reducer casing secured to the end of the torque tube, said tube acting to secure rigidly together the prime mover and reducer casing in proper alignment, a worm and worm gear in said casing, an extension shaft in the torque tube connecting together the worm and mover shaft, universal connection means on the worm gear extending outside the casing for selectively coupling the drive to suitable implements, and yoke brackets on the mover for accommodating same angularly on the ground, whereby said mover being on the ground, the casing can be elevated and connected to an implement for driving same at a reduced speed, the torque tube acting as a support for the casing and as a long lever at the end of which the mover rests on the ground by its own weight.

2. A drive as claimed in claim 1, comprising an extension of the worm projecting outside the reducer casing opposite the torque tube, said worm, tube and extension being in axial alignment.

3. A drive as claimed in claim 2, wherein the universal connecting means extend out of the casing at the side thereof, at right angles axially with the axis of the tube, worm and extension.

4. In a drive as claimed in claim 3, yoke brackets on the reducer casing, whereby the torque tube is maintained in parallel position to the ground when both the mover and casing are resting thereon.

5. In a drive as claimed in claim 4, transverse lugs formed at the top of the reducer casing in spaced-apart position, said lugs being adapted to receive a saw table.

6. A drive as claimed in claim 5, comprising means on the worm extension for receiving a circular saw adapted to co-operate with a saw table on the transverse lugs for sawing purposes.

JEAN PARMILLEUX.

REFERENCES CITED

The following references are of record in the file of this patent:

UNITED STATES PATENTS

| Number | Name | Date |
|---|---|---|
| 1,573,359 | Ruckstell | Feb. 16, 1926 |
| 1,645,224 | Brown | Oct. 11, 1927 |
| 1,755,973 | Upton et al. | Apr. 22, 1930 |
| 1,972,867 | Butler | Sept. 11, 1934 |
| 2,021,170 | Bronander | Nov. 19, 1935 |
| 2,087,785 | Sjolseth | July 20, 1937 |
| 2,097,729 | Mall | Nov. 2, 1937 |
| 2,128,979 | Altorfer | Sept. 6, 1938 |
| 2,172,126 | Lansing | Sept. 5, 1939 |
| 2,272,579 | Perry | Feb. 10, 1942 |